United States Patent [19]

Gonsior

[11] 3,800,827
[45] Apr. 2, 1974

[54] FLOW SAFETY VALVE FOR LIQUIDS

[75] Inventor: Franz Gonsior, Witten-Stockumg, Germany

[73] Assignee: ITT Industries, Inc., New York, N.Y.

[22] Filed: Aug. 21, 1972

[21] Appl. No.: 282,645

[52] U.S. Cl. .............. 137/614.2, 137/498, 137/459
[51] Int. Cl. ............................................. F16k 17/34
[58] Field of Search............ 137/614.2, 496, 614.21, 137/515.3, 498, 497, 484.4, 459, 458, 456, 216.2

[56] References Cited
UNITED STATES PATENTS

| | | | |
|---|---|---|---|
| 3,292,655 | 12/1966 | Horowitz | 137/456 |
| 3,138,174 | 6/1964 | Gilpin | 137/498 |
| 3,060,959 | 10/1962 | Foster | 137/498 |
| 2,160,582 | 5/1939 | Brugma | 137/497 |
| 1,900,514 | 5/1933 | McLean | 137/498 X |
| 1,214,553 | 2/1917 | Keppel | 137/496 |
| 1,228,593 | 6/1917 | Oleson | 137/614.21 X |
| 963,152 | 7/1910 | Jones et al. | 137/614.2 X |
| 644,422 | 2/1900 | Greenwood | 137/496 X |
| 2,927,598 | 3/1960 | Thompson | 137/614.2 X |
| 2,890,718 | 6/1959 | Smith | 137/614.2 X |
| 2,970,806 | 2/1961 | Rexford et al. | 137/614.2 X |
| 2,469,719 | 5/1949 | Ford, Jr. | 137/614.21 |
| 1,960,970 | 5/1934 | Fina | 137/614.2 X |
| 3,094,145 | 6/1963 | Chernak et al. | 137/614.2 |
| 225,622 | 3/1880 | Linehan | 137/614.2 |

Primary Examiner—Alan Cohan
Assistant Examiner—Ira S. Lazarus
Attorney, Agent, or Firm—John T. O'Halloran; Menotti J. Lombardi, Jr.; Peter Van Der Sluys

[57] ABSTRACT

The invention relates to a self-closing safety valve with automatic piston floating in the liquid, arranged in a casing together with a flow valve or in a separate casing.

Automatically closing valves arranged in a common housing with a normal shut-off valve are known in steam boiler installations. A so-called self-closing cone is mounted in a conical connection with lower and upper guides. In the event of a pipe burst, a significant drop in tension takes place after the self-closing cone, the self-closing cone being raised by the steam flowing through it and thus being forced against the opening to shut-off the steam. To prevent the valve closing during alternating operations, the self-closing cone is held at rest by means of a spring and may be adjusted to any mode of operation by a regulating screw. This well-known steam valve can thus only operate over a closely restricted pressure range. In contrast to this, the float-piston valve which is the subject of the invention is independent of a specific pressure and provides automatic operation over any pressure range. Merely the pressure differential between the top and bottom sides of the float-piston, which is determined by the flow volume, is utilized.

10 Claims, 11 Drawing Figures

PATENTED APR 2 1974

FLOW SAFETY VALVE FOR LIQUIDS

The invention is characterised by the float-piston being mounted in a casing attached to the flow fitting or having been separately manufactured, and having one or several bores with the result of the piston being drawn up at a predetermined flow volume and being forced against a valve seat by the liquid pressure to provide positive shut-off. Towards this end, the float-piston which is the subject of the invention is mounted in an inner casing which has openings in the top portion of its side (its jacket), the piston itself also having one or several bores with the result of the float-piston being forced up at a certain flow volume in litres per minute, shutting off the valve dependent on prevailing flow conditions.

FIG. 1 is a longitudinal section through the pilot valve in shut-off position.

FIG. 2 is a longitudinal section as per FIG. 1 of the pilot value in open position.

FIG. 3 is a longitudinal section through the internal casing with the float-piston at centre position.

FIG. 4 is a longitudinal section through the internal casing with a float-piston for reversed flow and the piston at centre position.

Figure 1:
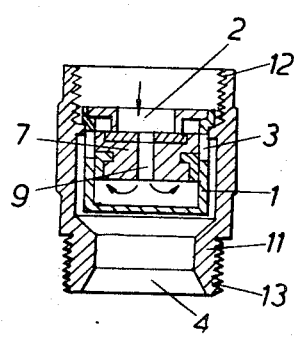
FIGS. 1 to 4 show an advantageous embodiment of the invention in a separately manufactured casing for installation ahead of the hose of a washing or dishwashing machine to be connected to the water pipe to shut-off water flow at excessive flow velocity.
Figure 2:
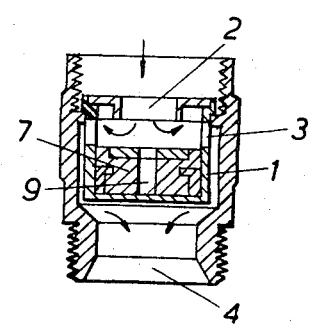
Figure 3:
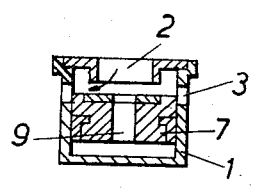
Figure 4:
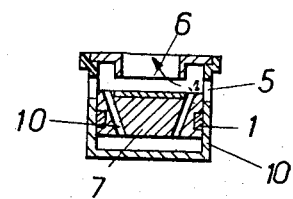

In the figures the direction of flow is shown by arrows. The inlet opening into the inner casing 1 is marked with 2. The liquid again leaves through the side openings 3, runs past the jacket of the inner casing 1 to the outlet 4. With reversed flow (FIG. 4) the liquid enters through the side openings 5 into the inner casing 1 and again leaves through the opening 6. In both cases, the liquid plays over the piston 7 and is diverted through about 90° at this point. This diversion across the float-piston 7 is of primary importance.

In the process, pressure expansion is achieved at a certain flow velocity across the float piston 7. The pressure on the underside of the float-piston 7 becomes larger than on the top, the float-piston 7 being forced up and/or in the direction of flow thus shutting off valve flow. Depending on the direction of flow the liquid passes through the centre bore 9 or through the the inclined bores 10 of the float-piston arranged on the side, forcing the piston against the inlet or outlet openings. For the piston 7 to be forced up it must have one or several through-bores 9 connecting the bottom and top sides of the piston 7; the sides may thus be sealed. A connection also exists if the float-piston 7 has been inserted into the guide with the necessary clearance, i.e. if it is not sealed on the side when the liquid may pass along the side to the underside of the piston.

In the present embodiment of the invention the internal casing 1 is mounted in a separately manufactured cylindrical outer casing 11 which is to be connected between water flow fitting and hose by means of the threads 12 and 13.

FIGS. 5 to 8 show a variation of this embodiment in combination with a non-return valve which may, for instance, be used on a washing machine to prevent wash being sucked back into the water-line if there is no water pressure.

Figure 5:
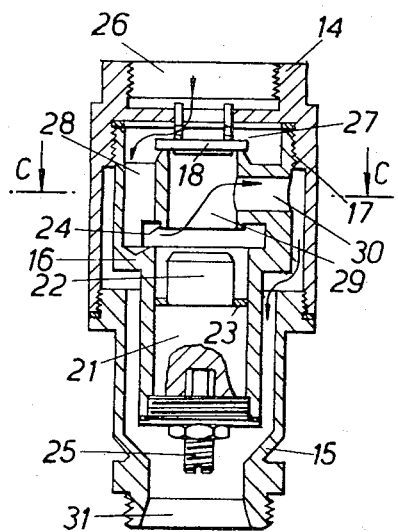

FIG. 5 is a longitudinal section A–B with safety valve and non-return valve in open position.

Figure 6:
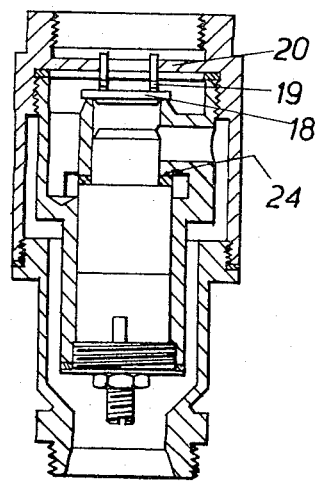

FIG. 6 ditto with safety valve in closed position.

Figure 7:
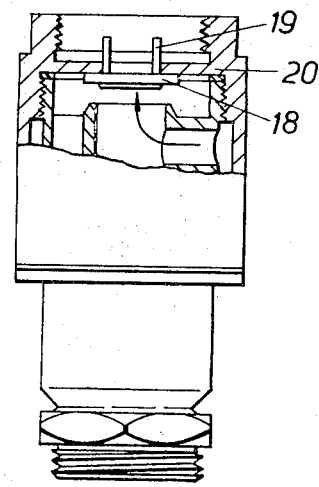

FIG. 7 ditto with non-return valve in closed position.

Figure 8:
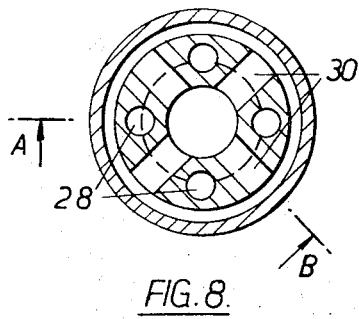

FIG. 8 is the section C—C.

The outer casing consists of the screwed together cylinder pieces 14 and 15, the inner casing 16 being fixed in part 14 by means of screw thread 17. 18 is the non-return valve slide-guided in the valve plate 20 by means of the perforated cylinder boss 19. 21 is the float-piston guided in the inner casing with boss 22 and seal 23 sealing against the seat 24 when the piston moves up (see FIG. 6). Screw 25 is used to set the float-piston for height and thus adjust its sensitivity. The liquid entering through the inlet 26 passes through the perforated cylinder boss 19 radially into the annular space 27 and then through the passages 28 into the space 29 and radially through the passages 30 to the outlet 31.

Figure 9:
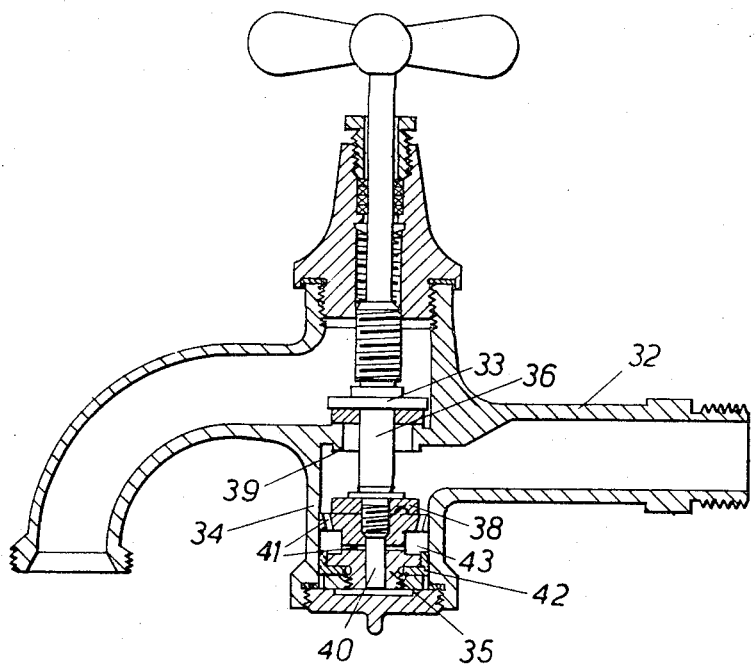
Figure 10:
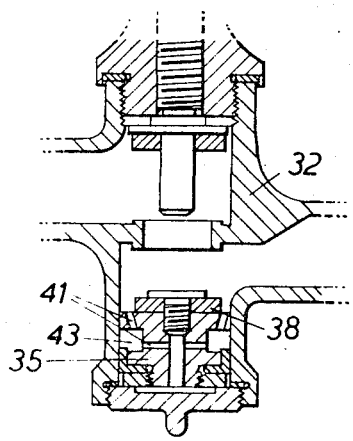
Figure 11:
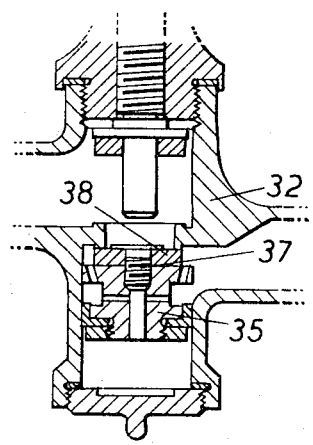

FIGS. 9 to 11 show an advantageous embodiment of the invention arranged on a tap valve. FIG. 9 shows a longitudinal section of the tap valve in closed position. FIG. 10 shows the tap valve in open position. FIG. 11 shows the same with the flow safety valve in closed position.

32 is a tap valve of well-known design which, together with the valve 33, opens and closes the flow opening. 34 is the casing forming an integral part with the flow fitting housing for mounting the float-piston 35 which is forced into bottom-most position by the extension piece 36 of the valve spindle when the tap valve is in closed position. The float-piston holds the sealing disc 38 fixed by means of the screw 37, which shuts off flow at the seat 39 (see FIG. 11).

If, with the tap valve in open position, the flow volume is exceeded, say, by the connection hose bursting, the excessive flow velocity combined with the pressure drop across the float-piston draws the piston up against its seat seal. The actual sealing pressure is then generated by the overflow beneath the float-piston through the bores, 40, 41 arranged in the piston. To ensure the piston closing slowly and thus preventing water hammer, the piston is provided with the seal ring 42 and the bores 41 are dimensioned as throttle bores. With the help of the annular recess 43 fast flow of pressure water to the underside of the piston is ensured as and when the float-piston reaches its sealing position.

I claim:

1. A flow safety valve for liquids, comprising:
    a housing;
    an inlet formed in said housing for receiving the liquid under pressure;
    an outlet formed in said housing for discharging the liquid;
    a float piston disposed in said housing and normally disposed in a first position wherein the inlet and outlet are in communication, said piston and housing being formed and arranged so that the piston blocks communication between the inlet and outlet when the piston is in a second position;
    means for communicating the liquid under inlet pressure to a bottom surface of the piston in both the first and second positions; and
    means for directing the liquid across a top surface of said float piston when in the first position, whereby the piston is drawn into the second position upon the occurence of a predetermined liquid velocity across the top surface of the piston and said communicating means communicates liquid pressure to the bottom surface of the piston so that the piston is maintained in the second position and liquid is prevented from passing through the housing.

2. A flow safety valve as described in claim 1, wherein the communicating means comprises a bore extending through said float piston.

3. A flow safety valve as described in claim 1, wherein the float piston fits loosely within the housing and the communicating means comprises a space between the float piston and the housing.

4. A flow safety valve as described in claim 1, wherein the housing includes threaded connecting means for connecting the housing into a liquid supply line.

5. A flow safety valve as described in claim 4, additionally including a non-return valve mounted in said housing.

6. A flow safety valve as described in claim 1, wherein the housing additionally comprises an annular seat formed about said outlet and the float piston includes a valve means for cooperating with the annular seat for closing the outlet when in the second position.

7. A flow safety valve as described in claim 1, additionally comprising an adjustment screw for adjusting the float piston.

8. A flow safety valve as described in claim 1, wherein the housing is formed in a tap valve and is positioned in axial alignment with a valve spindle mounted in said tap valve.

9. A flow safety valve as described in claim 8 wherein the valve spindle includes an extension piece for forcing the float piston into the first position when the tap valve is closed.

10. A flow safety valve as described in claim 1, wherein the float piston includes a seal ring for engaging the housing and preventing water hammering and the communicating means comprises throttle bores extending through the float piston and leading to the underside of said float piston.

* * * * *